(12) United States Patent
Yamamoto et al.

(10) Patent No.: US 10,992,909 B2
(45) Date of Patent: Apr. 27, 2021

(54) VIDEO RECORDING DEVICE AND HEAD MOUNTED DISPLAY

(71) Applicant: Hitachi, Ltd., Tokyo (JP)

(72) Inventors: Shoji Yamamoto, Tokyo (JP); Chiyo Ohno, Tokyo (JP); Koji Yamasaki, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 16/711,777

(22) Filed: Dec. 12, 2019

(65) Prior Publication Data

US 2020/0275062 A1 Aug. 27, 2020

(30) Foreign Application Priority Data

Feb. 22, 2019 (JP) .............................. JP2019-030441

(51) Int. Cl.
*H04N 7/18* (2006.01)
*H04N 5/77* (2006.01)

(52) U.S. Cl.
CPC ............... *H04N 7/185* (2013.01); *H04N 5/77* (2013.01)

(58) Field of Classification Search
None
See application file for complete search history.

(56) References Cited

U.S. PATENT DOCUMENTS

| 10,048,922 B2 * | 8/2018 | Kobayashi | ......... G02B 27/0093 |
| 2018/0082656 A1 * | 3/2018 | Ito | ......................... G06F 3/0308 |
| 2019/0219517 A1 * | 7/2019 | Horiguchi | .......... G01N 21/8851 |

FOREIGN PATENT DOCUMENTS

JP 2012-168683 A 9/2012

* cited by examiner

*Primary Examiner* — Lindsay J Uhl
(74) *Attorney, Agent, or Firm* — Crowell & Moring LLP

(57) ABSTRACT

A video recording device includes: a camera which captures a video of a visual-field direction of a wearer; a connection part which is communicably connected to an external sensor which detects predetermined environment information; a threshold information storage part which stores a threshold indicating an abnormal state of the environment information; a determination part which outputs an abnormality determination signal by comparing detection information of the external sensor and the threshold; a control part which outputs a predetermined control signal to the camera in response to the abnormality determination signal; and a display part which displays output information from the camera and the external sensor. When the abnormality determination signal is output, the control part outputs a control signal for transferring output information from the camera to a predetermined storage part.

14 Claims, 20 Drawing Sheets

| PROCESS NO | DATA | TEXT | NUMERICAL INFORMATION |
|---|---|---|---|
| 1 | OPTIMAL RANGE (20-35°C) | NORMALITY | |
| | ABNORMAL RANGE (T<20°C, 35°C<T) | ABNORMALITY | |
| | | CAMERA RECORDING START | |
| | | PLEASE ALIGN POSITION OF EXTERNAL SENSOR TO DISPLAY CENTER RECORDING | COORDINATE INFORMATION OF DISPLAY CENTER |
| | | RECORDING | |
| 2 | | | |

FIG. 22

|   | AMPLITUDE | PERIOD | AMPLITUDE | PERIOD | AMPLITUDE | PERIOD |
|---|---|---|---|---|---|---|
| 1 | X11 | X12 | Y11 | Y12 | Z11 | Z12 |
| 2 | X21 | X22 | Y21 | Y22 | Z21 | Z22 |
| 3 | X31 | X32 | Y31 | Y32 | Z31 | Z32 |
| 4 | X41 | X42 | Y41 | Y42 | Z41 | Z42 |

VIDEO RECORDING DEVICE AND HEAD MOUNTED DISPLAY

BACKGROUND OF THE INVENTION

1. Field of the Invention

The present invention relates to a video recording device and a head mounted display.

2. Description of the Related Art

As a background art in this technical field, there is JP 2012-168683 A. In this document, a field support system is described in which a gas sensor is mounted on a head mounted display (HMD) and an accident is prevented by specifying a gas generation direction in linkage with multiple pieces of position information and notifying a user.

SUMMARY OF THE INVENTION

In the technique described in JP 2012-168683 A, it is not considered to efficiently record a work situation or the like with hardware resources such as a limited storage area without hindering work.

An object of the present invention is to efficiently record a work situation or the like with hardware resources such as a limited storage area without hindering the work.

The present application includes a plurality of units for solving at least a part of the above-described problems. Examples thereof include as follows. In order to solve the above-described problem, a video recording device according to an aspect of the present invention includes: a camera which captures a video of a visual-field direction of a wearer; a connection part which is communicably connected to an external sensor which detects predetermined environment information; a threshold information storage part which stores a threshold indicating an abnormal state of the environment information; a determination part which outputs an abnormality determination signal by comparing detection information of the external sensor and the threshold; a control part which outputs a predetermined control signal to the camera in response to the abnormality determination signal; and a display part which displays output information from the camera and the external sensor. When the abnormality determination signal is output, the control part outputs a control signal for transferring output information from the camera to a predetermined storage part.

According to the present invention, the work situation or the like can be efficiently recorded with hardware resources such as a limited storage area without hindering work. Problems, configurations, and effects other than those described above will be clarified by the following description of embodiments.

BRIEF DESCRIPTION OF THE DRAWINGS

FIG. 22 is a diagram illustrating an example of the data structure of the threshold information storage part in the case of the acceleration sensor;

DESCRIPTION OF THE PREFERRED EMBODIMENTS

Figure 1:
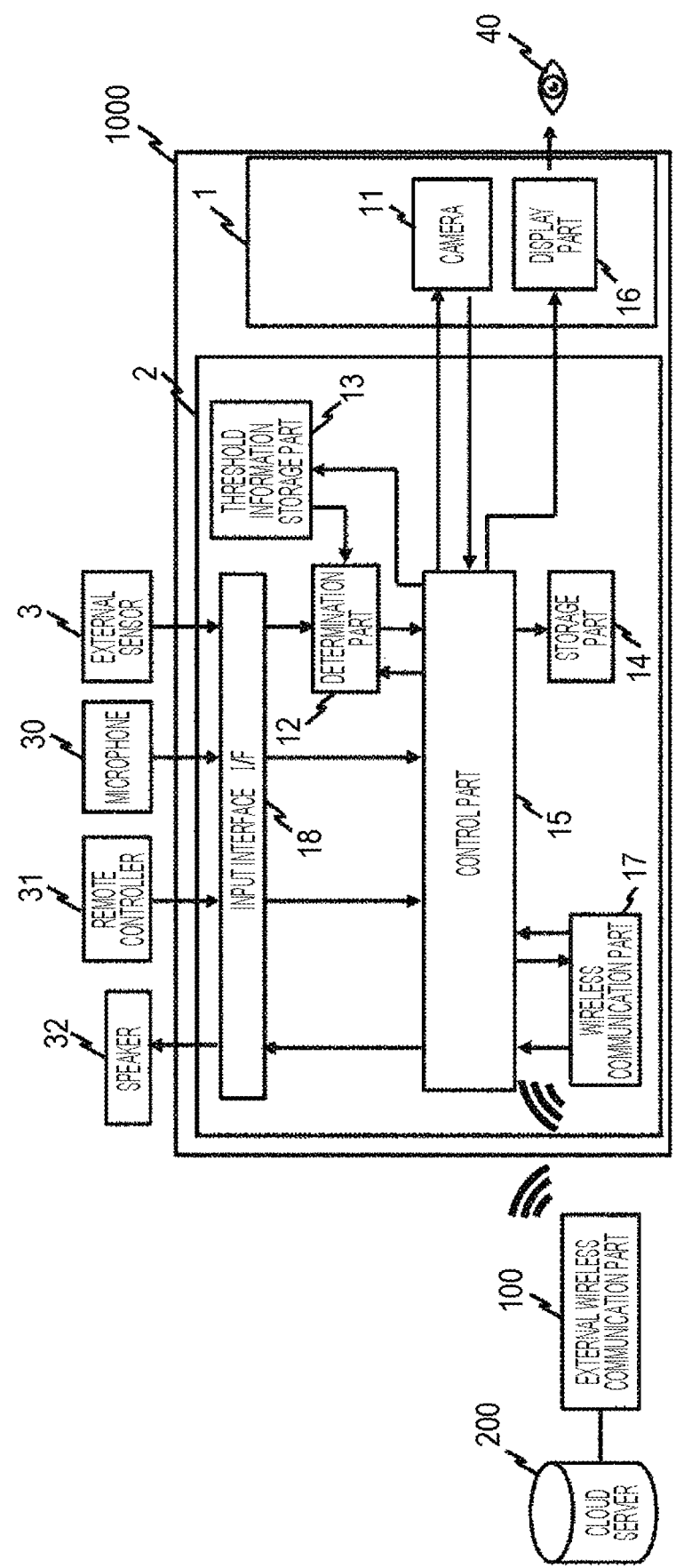
FIG. 1 is a diagram illustrating a configuration example of a video recording device according to a first embodiment of the present invention.

Embodiments of the present invention will be described in detail below with reference to the accompanying drawings. Incidentally, the same members are denoted by the same reference numerals throughout the drawings for describing the embodiments, and the repetitive description thereof will be omitted. In addition, in the following embodiments, the components (including element steps and the like) are not necessarily essential except cases where the components are explicitly described in particular, and the components are considered to be clearly essential in principle. In addition, when referring to "formed of A", "configured of A", "having A", and "including A", other elements are not excluded unless it is specifically stated that only that element is included. Similarly, in the following embodiments, when referring to the shapes, positional relationships, or the like of the components or the like, components or the like having substantially the same or similar shapes are included except cases or the like where the shapes are explicitly described in particular, or unless otherwise apparent in principle.

In recent years, a transmissive head mounted display (HMD) has been commercialized and used for work support in factories and the like. The transmissive HMD is a kind of wearable computer which can present information without obstructing a visual field when a transmissive display made of a material, which is nearly transparent to visible light, such as glass or plastic is arranged so as to intersect with the visual line of the wearer. In general, a user wearing the transmissive HMD can check and operate a work procedure by projecting and displaying information related to work support on a transmissive virtual screen while viewing own work target.

For example, as described in the prior art document, in order to further expand from work support and check whether the state of the equipment to be worked is operating normally, a technique can be provided in which the surrounding state is detected by a sensor mounted on the HMD, and the data thereof, and the data is given to the user as feedback.

On the other hand, in recent years, in order to eradicate human errors of workers and to monitor the state of work objects and appropriate work, there is an increasing need to record work objects, target characters, the work of a worker, or the like. As a means for acquiring the situation at the site, there is video recording by a camera mounted on the HMD. However, in order to record all works, the storage capacity becomes enormous, and the HMD tends to be enlarged. In addition, since the calculation load becomes heavy, the battery consumption of the HMD tends to increase, and the usage time of the HMD tends to be shortened. Both of the cases bring about the enlargement of the HMD, which is not desirable. In addition, when the work site is a basement or the like, it may be difficult to communicate with a remote device. Thus, it is difficult to adopt a technique that uses a remote storage such as a cloud storage that is constantly used through a network.

In view of such a situation, it is effective to use a means which selects information that needs to be recorded in the HMD and does not increase the storage capacity of the HMD. When a person makes this selection decision, omission of recording is likely to occur due to subjectivity or human error. Therefore, it is important to perform video recording with a camera mounted on the HMD in objectively necessary situations regardless of human judgment.

FIG. 1 is a diagram illustrating a configuration example of a video recording device according to a first embodiment of the present invention. A video recording device 1000 is implemented as a head mounted display, but is not limited thereto, and may be implemented as a so-called smartphone or tablet device. The video recording device 1000 includes a head mount part 1 and a controller 2. The head mount part 1 includes a camera 11 and a display part 16. The camera 11 can acquire a moving image and a still image by acquiring a visible light image at a predetermined field angle. The display part 16 is a transmissive display, which is formed of a material that is nearly transparent to visible light, such as glass or plastic. Even when the display part 16 is arranged to be reflected within the view of an eye 40 of the wearer, the display part 16 transparently presents information without disturbing the visual field of the wearer.

The controller 2 includes a determination part 12, a threshold information storage part 13, a storage part 14, a control part 15, a wireless communication part 17, and an I/F 18. The wireless communication part 17 can perform remote communication with a cloud server 200 connected to the network through an external wireless communication part 100. The I/F 18 is an input interface that is a connection part that can be connected to an external sensor 3, a microphone 30, a remote controller 31, and a speaker 32.

Various kinds of surrounding environment information acquired by the external sensor 3 is input to the determination part 12 through the I/F 18. The determination part 12 performs a determination according to the environment information acquired by the external sensor 3 and the data of the threshold information storage part 13 and outputs an abnormality determination signal or a normality determination signal that is a control signal according to the determination result to the control part 15. The threshold information storage part 13 stores a threshold indicating a boundary between the range of a normal value and the range of an abnormal value for various kinds of surrounding environment information acquired by the external sensor 3.

The control part 15 issues a predetermined command to the camera 11 according to the output signal of the determination part 12. For example, the command includes the activation of the camera 11, a video transfer request, and the like. In addition, the control part 15 stores the still image or moving image acquired from the camera 11 according to the output signal of the determination part 12 in the storage part 14. The storage part 14 stores still image data or moving image data.

The control part 15 generates an image from the video of the camera 11, work information, the acquired data of the external sensor 3, and the like and outputs the image to the display part 16.

The control part 15 rewrites the data of the threshold information storage part 13 from the data acquired from the wireless communication part 17. In addition, the control part 15 acquires the video of the camera 11 and the data of the storage part 14 and outputs the acquired data to the wireless communication part 17.

The control part 15 may display not only the still image or the moving image acquired by the camera 11 but also, for example, work information data and information known to the wearer on the display part 16. The work information data includes, for example, work processes, drawings, and past work records. In the information known to the wearer, information such as the change information of the threshold of the threshold information storage part 13 may be displayed for the purpose of notifying the user when the parameters of the HMD are changed. At that time, the display part 16 displays a screen for checking whether or not the wearer can make a change and performs an interactive display in which the user approves or rejects the change.

The wireless communication part 17 performs wireless communication with the external wireless communication part 100. For example, WiFi (registered trademark) or Bluetooth (registered trademark) is used as the communication standard. The external wireless communication part 100 transmits the data received from the wireless communication part 17 to the cloud server 200. The cloud server 200 is an information processing device on the remote administrator side and is connected to the HMD of the wearing worker from the remote administrator side to share video and audio, change setting values, and acquire data or the like. The data received by the external wireless communication part 100 from the wireless communication part 17 may be a still image or a moving image of the camera 11 or environment information acquired by the external sensor 3.

The external wireless communication part 100 transmits data received from the cloud server 200 to the wireless communication part 17. In a case where the data received by the wireless communication part 17 is a change of threshold information, the control part 15 causes the threshold information storage part 13 to output and update the threshold information.

The remote controller 31 is a remote control device that receives an instruction to operate the HMD. For example, the remote controller receives an instruction to move a cursor or select an option displayed on the display part 16. Incidentally, the remote controller 31 may have a structure integrated with the external sensor 3, for example. For example, in a case where the external sensor 3 is a close-up camera, some hardware buttons may be provided for the input operation on a handle.

Figure 2:
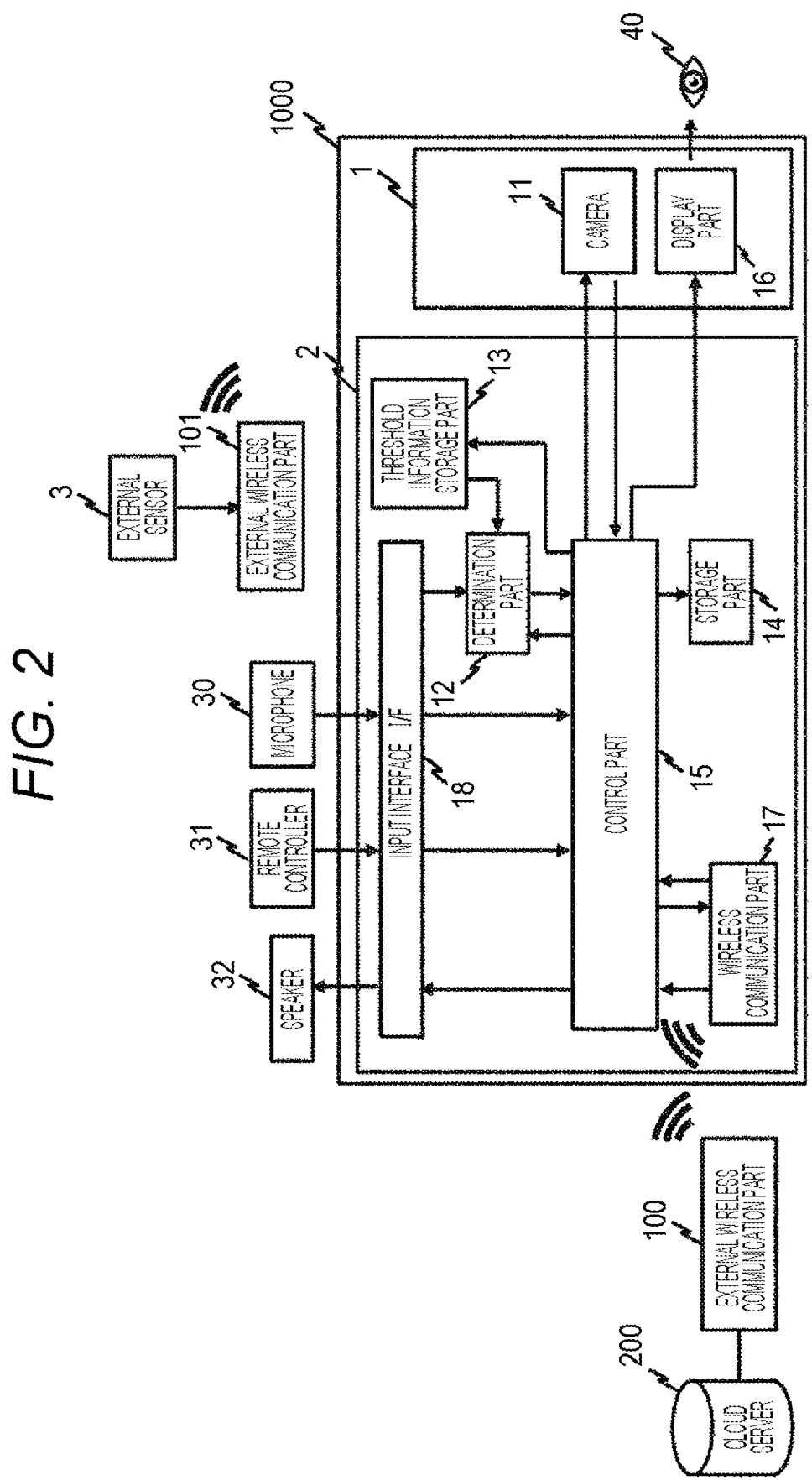
FIG. 2 is a diagram illustrating another configuration example of the video recording device.

FIG. 2 is a diagram illustrating another configuration example of the video recording device. In this configuration example, the external sensor 3 includes an external wireless communication part 101. Similarly with the external wireless communication part 100 illustrated in FIG. 1, the external wireless communication part 101 uses, for example, WiFi or Bluetooth as a communication standard. In this case, the control part 15 outputs data transmitted from the external sensor 3 through the external wireless communication part 101 and the wireless communication part 17 to the determination part 12. By adopting such a form, the external sensor 3 can realize the same function even when connected by wire or wireless.

Figure 3:
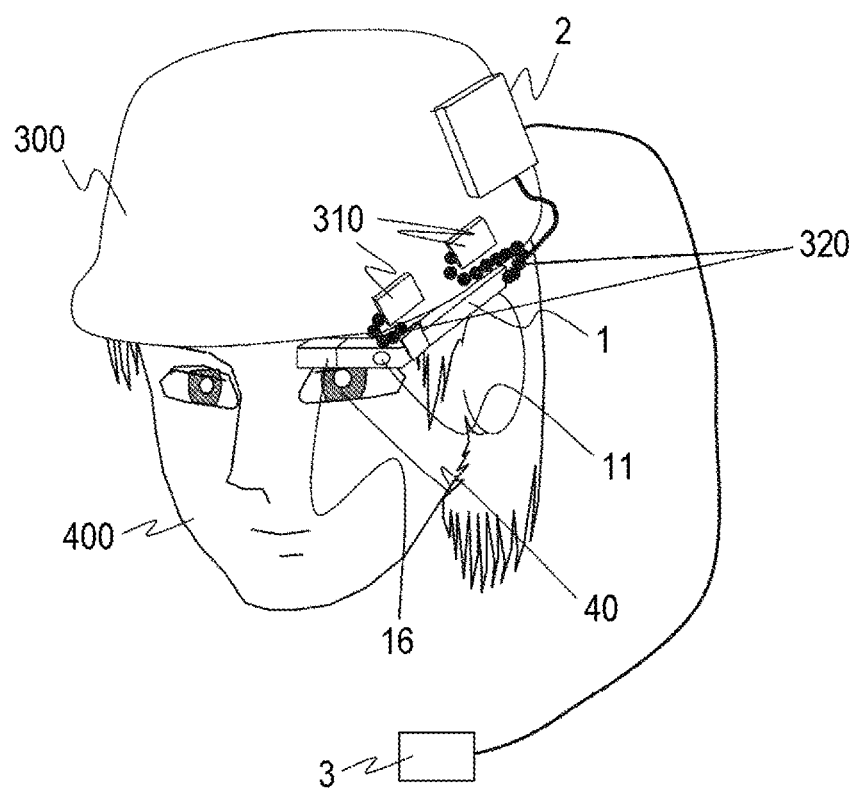
FIG. 3 is a diagram illustrating an example of an external appearance when the video recording device is mounted.

FIG. 3 is a diagram illustrating an example of an external appearance when the video recording device is mounted. In the work support, a worker 400 often wears a helmet, and thus an example is described in which the video recording device 1000 is connected to the helmet.

It is assumed that the worker 400 wears a helmet 300 on the head. The helmet 300 is provided with a fixing jig 310 and a flexible arm 320 that extends from the fixing jig 310 and can be bent. The flexible arm 320 is connected to the head mount part 1 and supports the head mount part 1 at a predetermined position.

The camera 11 of the head mount part 1 is installed substantially in parallel with the gaze direction of the eye 40 of the worker 400, that is, in the same direction. The controller 2 is assembled to the helmet 300. The display part 16 of the head mount part 1 is adjusted so as to intersect with the visual line of the eye 40 of the worker 400 and is supported by the flexible arm 320.

As illustrated in FIG. 3, the head mount part 1 is supported at two predetermined points on the head mount part 1 or at two or more points. In the support at one point, rotation is easily made with the support part as a fulcrum in multiple directions, and thus the positional relationship between the eye 40 of the worker 400 and the display part 16 is easily shifted. When the position is shifted, the video is chipped or blurred when viewed from the worker 400, leading to a degradation in visibility. When the head mount part is supported at multiple (two or more) points, the head mount part 1 becomes difficult to rotate, and thus visibility degradation can be suppressed.

The effective support points are two points which are the end of the head mount part 1 facing the display part 16 and the part where the head mount part 1 is bent into an L shape. By supporting in such a position, the view of the camera 11 is not obstructed, and the view of the eye 40 of the worker 400 cannot be affected.

The external sensor 3 is assumed to be brought close to the measurement object with the hand of the worker 400. Therefore, the external sensor 3 is separate from the head mount part 1 and the controller 2 and is connected to the I/F 18 that is a connection part of the controller 2 through a wired or wireless communication path. Incidentally, the I/F 18 can use various wired communication standards such as a universal serial bus (USB) and an auxiliary (AUX) as long as a connection is a wired connection.

As the external sensor 3, for example, a temperature sensor, a humidity sensor, an infrared camera, a visible light camera, a time of flight (TOF) camera, an acceleration sensor, a radiation dose sensor, a gas sensor, or the like can be used. FIG. 3 illustrates an example in which the controller 2 is connected to the external sensor 3 by wire. However, as illustrated in FIG. 2, the external sensor 3 may be provided with the external wireless communication part 101 and connected to the controller 2 by wireless communication.

Figure 4:
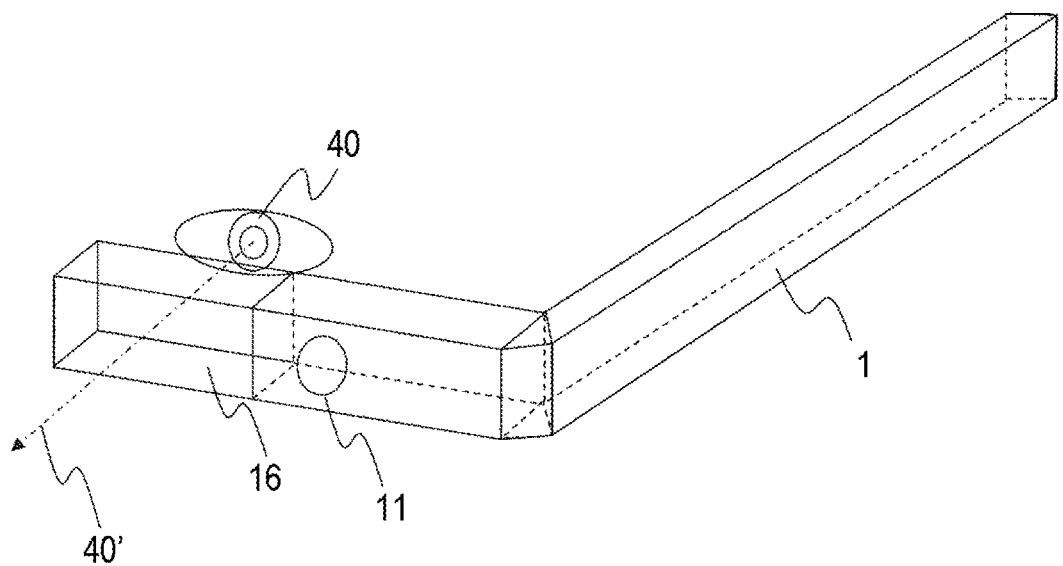
FIG. 4 is a diagram illustrating a structural example of a head mount part.

FIG. 4 is a diagram illustrating a structural example of the head mount part 1. The head mount part 1 includes a camera 11 connected to an end of a rod-shaped support member formed of resin or the like in a substantially L shape (not necessarily strictly right angle) and a display part 16. The display part 16 is provided at a position where a gaze direction 40' of the eye 40 of the worker 400 is transmitted. In addition, the camera 11 is provided with a photographing center line substantially in parallel with the gaze direction 40'. However, the present invention is not limited thereto, and the camera 11 may be any camera as long as it captures a visual-field direction substantially parallel to the gaze direction 40'. For example, the camera 11 may have a wider field angle than human eyes.

Figure 5:
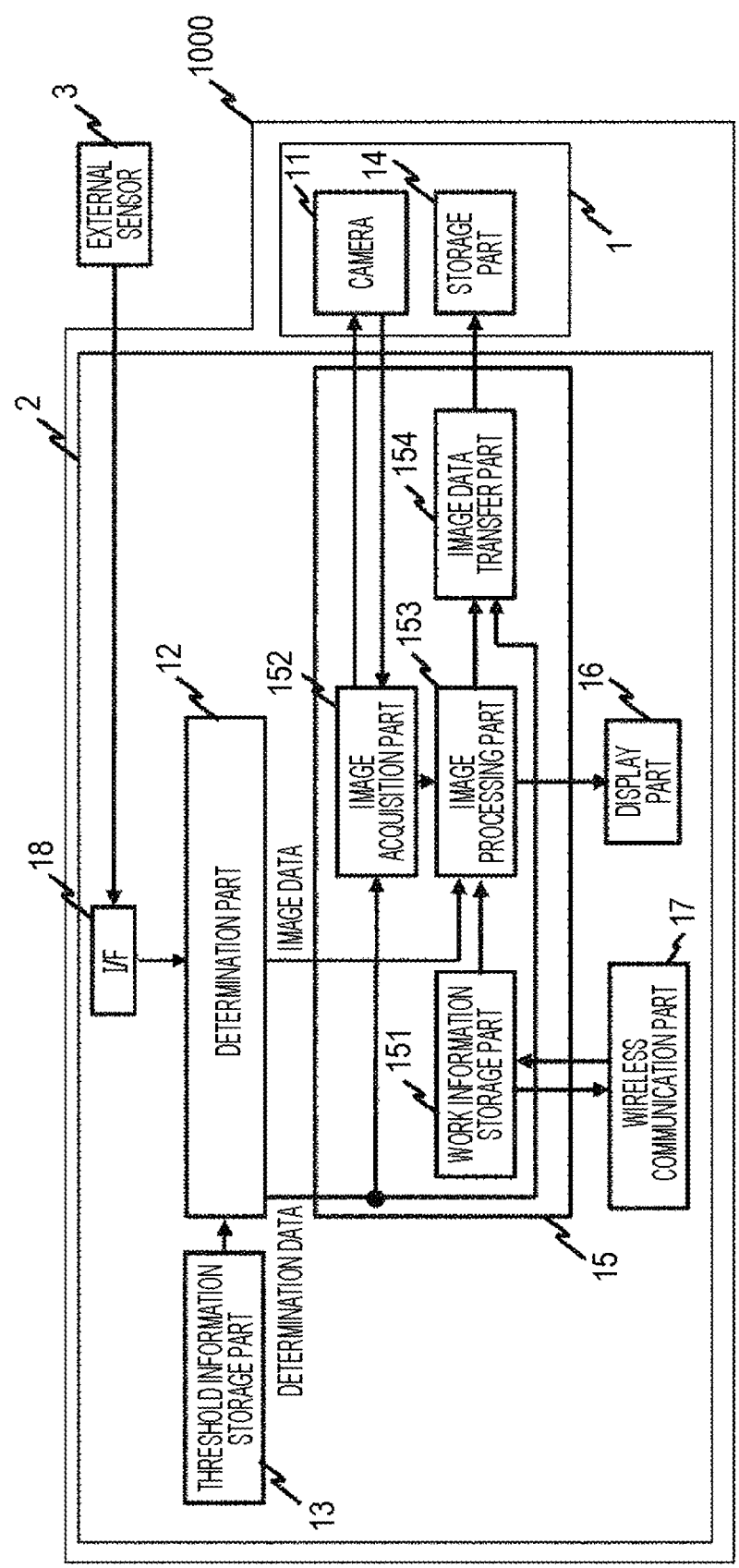
FIG. 5 is a block diagram illustrating an example of an internal structure of a control part.

FIG. 5 is a block diagram illustrating an example of an internal structure of the control part. The control part 15 includes a work information storage part 151, an image acquisition part 152, an image processing part 153, and an image data transfer part 154.

The work information storage part 151 stores work information. The work information is information associated with information for dividing the work into predetermined processes and specifying an operation that becomes a point related to each work and timing for recording an important video recording and can take various data formats. The work information storage part 151 delivers work information in response to a request from the image processing part 153. In addition, when work information is received together with an update instruction from the wireless communication part 17, the work information storage part 151 updates the work information.

The image acquisition part 152 makes an image transfer request to the camera 11 according to the determination result signal of the determination part 12 and acquires images (including still images and moving images). Then, the image acquisition part 152 delivers the acquired image to the image processing part 153.

The image processing part 153 generates the image to be output to the display part 16 by using the image data acquired by the image acquisition part 152 (if there is the image data), the image data of the external sensor 3 (when the external sensor 3 is a camera) output from the determination part 12 (if there is the image data), and the work information of the work information storage part 151. In a case where the value detected by the external sensor 3 is in an abnormal state, the image processing part 153 may synthesize (for example, superimpose) and display text data indicating that the abnormal state has occurred on the display part 16. Details of the superimposition display process of the text data will be described later.

When the image transfer request to the camera 11 according to the determination data of the determination part 12 is made by the image acquisition part 152, the image data transfer part 154 transfers the image data generated by the image processing part 153 to the storage part 14. For example, in a case where the determination data output from the determination part 12 is 0 (GND level), the image data transfer part 154 does not transfer data, but in a case where the determination data is 1 (power supply level), the image data transfer part 154 performs data transfer to the storage part 14. In this case, the data to be transferred to the storage part 14 may be a moving image or a still image or may superimpose work display and abnormal state display on the video of the camera 11. As described above, the example is described in which the determination data is any of 0 or 1. However, the determination part 12, the image acquisition part 152, and the image data transfer part 154 may be controlled by a predetermined command. The work information storage part 151 may update the work information with data received from the wireless communication part 17.

Figures 6, 7:
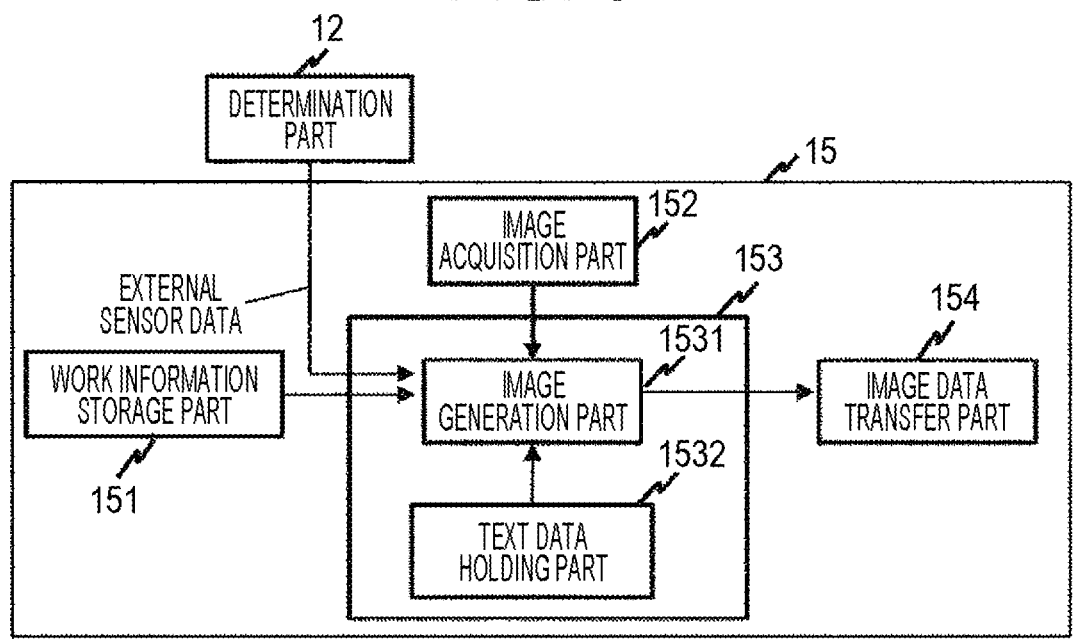
FIG. 6 is a block diagram illustrating an example of an internal structure of an image processing part.
FIG. 7 is a diagram illustrating an example of a data structure of a text data holding part.

FIG. 6 is a block diagram illustrating an example of the internal structure of the image processing part. The image processing part 153 includes an image generation part 1531 and a text data holding part 1532. In the text data holding part, various kinds of message information such as "normality", "abnormality", "camera recording start", "please align the position of the external sensor to the display center", and "recording" are stored according to the process of the work information.

FIG. 7 is a diagram illustrating an example of the data structure of the text data holding part. The text data holding part 1532 stores data 1532B (display condition), text 1532C, and numerical information 1532D in association with each other for each process No 1532A.

When the output of the external sensor 3 has a condition for displaying the text 1532C, the data 1532B indicates the condition. For example, the condition includes the condition of the detection value of the temperature sensor such as "optimal range of 20° to 35°" and "abnormal range of T<20° and 35°<T". The text 1532C stores text information mainly including a message to the worker. When the coordinates of the position to be displayed are specified by numerical values, the numerical information 1532D is information for specifying the coordinates.

The description returns to FIG. 6. The image generation part 1531 generates an image superimposed by using the work information of the work information storage part 151, the data of the external sensor 3 received through the determination part 12, the text data of the process read from the text data holding part 1532, and the acquired image of the camera 11 acquired from the image acquisition part 152 and delivers the image to the image data transfer part 154.

For example, when the detection value of the external sensor 3 is normal, the image generation part 1531 generates the data of the external sensor 3 and the text (such as "normality") according to the optimal range of the data as an image and delivers the data to the image data transfer part 154. When the detection value of the external sensor 3 is abnormal, the image generation part 1531 superimposes the data of the external sensor 3 and the text (such as "abnormality") according to the abnormal range of the data on the acquired image by the camera 11 acquired from the image acquisition part 152 to generate an image and delivers the image to the image data transfer part 154.

The image generation part 1531 displays the subsequent message text "camera recording start" in a superimposed manner, and then superimposes "please align the position of the external sensor to the display center" to display a guide corresponding to the center of the display on the coordinates of the numerical information 1532D. Further, when the position of the external sensor 3 is aligned with the display center, the image generation part 1531 displays the message text "recording" in a superimposed manner. Incidentally, whether or not the position of the external sensor is aligned in the range of the center of the display can be realized when the image generation part 1531 determines whether or not the specific information (light quantity, symbol, marking such as characters, color pattern, heat pattern, sound pattern, or the like) of the external sensor 3 satisfies a prescribed condition.

Figure 8:
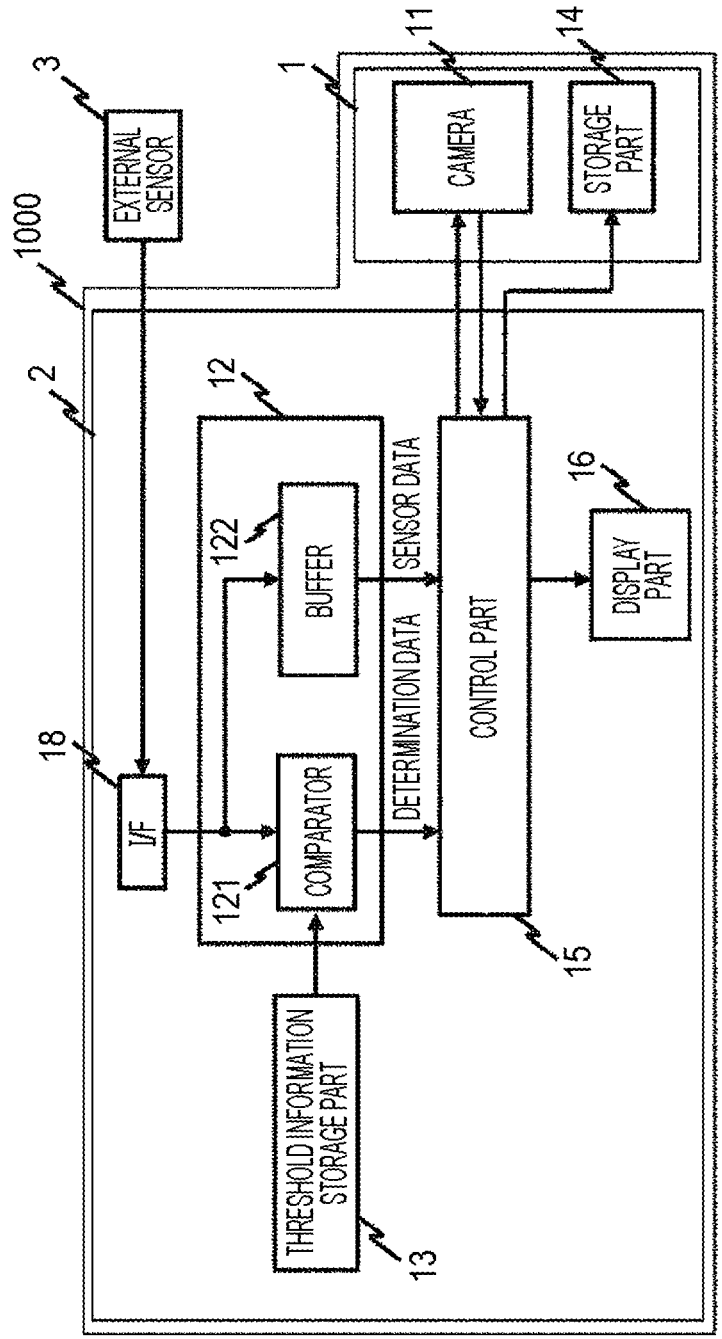
FIG. 8 is a block diagram illustrating an example of an internal structure of a determination part.

FIG. 8 is a block diagram illustrating an example of the internal structure of the determination part. The determination part 12 includes a comparator 121 and a buffer 122. The comparator 121 compares the data of the external sensor 3 received through the I/F 18 with the threshold of the threshold information storage part 13 and outputs determination data. For example, in a case where the data of the external sensor 3 is smaller than the threshold information, the comparator 121 outputs "0 (GND level)" as determination data. In a case where the data of the external sensor 3 is larger than the threshold information, the comparator 121 outputs "1 (power supply level)" as determination data.

The determination data is not only "0" and "1" levels as described above, but also may be exchanged with the control part 15 by commands in a case where the comparator 121 is configured as an internal function block such as a micro control unit (MCU). The buffer 122 buffers the data acquired by the external sensor 3 and outputs the data to the control part 15.

Figure 9:
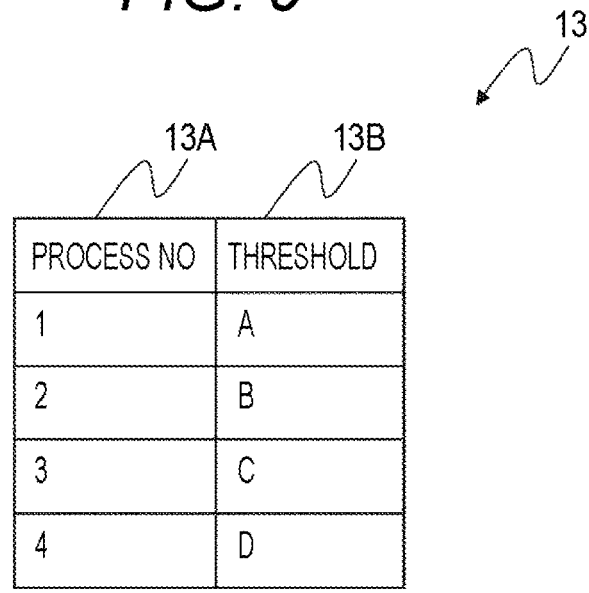
FIG. 9 is a diagram illustrating an example of a data structure of a threshold information storage part.

FIG. 9 is a diagram illustrating an example of a data structure of the threshold information storage part. In the threshold information storage part 13, a threshold 13B is associated with each process No 13A. That is, a threshold for distinguishing the normality and abnormality of the external sensor 3 for each process is stored.

Figure 10:
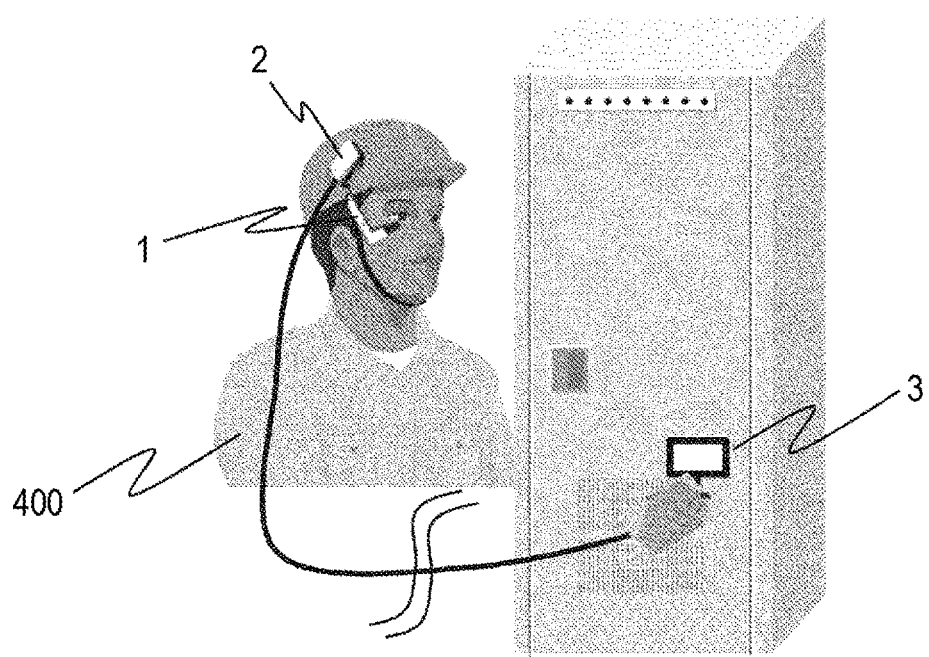
FIG. 10 is a diagram illustrating an example of a usage state of the video recording device.

FIG. 10 is a diagram illustrating an example of a usage state of the video recording device. FIG. 10 illustrates a state in which a worker 400 wearing the helmet 300 provided with the video recording device 1000 is performing a board work, and the external sensor 3 is in contact with the target board. Here, the external sensor 3 is illustrated as being in contact with the target board. However, the measurement may be performed without contact, or data may be acquired by communicating with the external sensor 3 provided on the board. The monitoring process of the video recording device 1000 will be described below while giving an example in which a temperature sensor is used as the external sensor 3.

Figure 11:
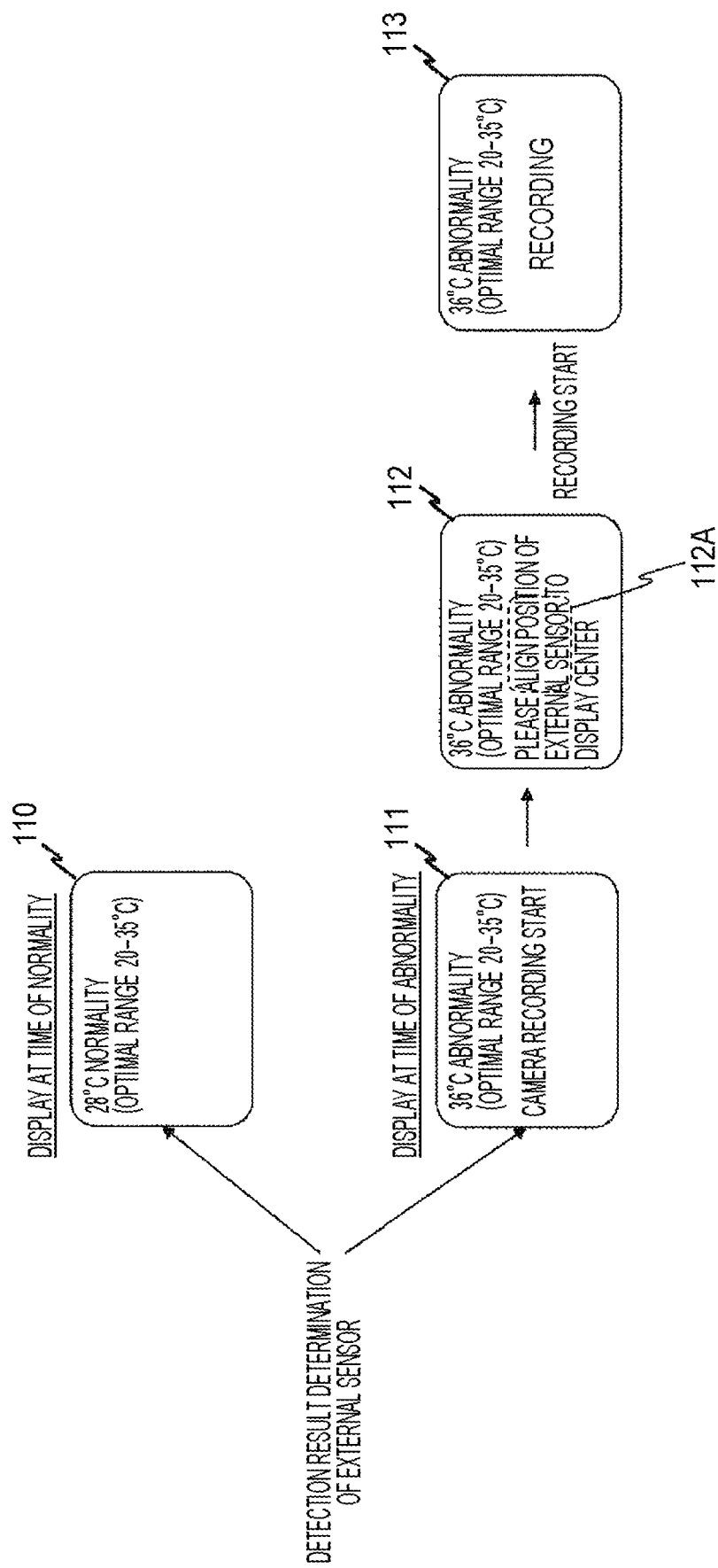
FIG. 11 is a diagram illustrating a transition example of a display screen of a HMD.

FIG. 11 is a diagram illustrating a transition example of the display screen of the HMD. According to the abnormality determination result of the data detected by the external sensor 3, the transition of the display screen at the time of normality and the transition of the display screen at the time of abnormality are described.

On a display screen 110 at the time of normality, the data acquired by the external sensor 3, the message text "normality" of the determination result, and the threshold of the determination criterion are displayed in a superimposed manner. A normal view can be obtained which transmits the area other than these texts displayed in a superimposed manner from the eye 40 of the worker 400. The purpose of displaying the threshold of the determination criterion is to make the worker 400 aware of the possibility of being close to an abnormality even within a normal range. In order to prevent a failure or an accident, the transition of past temperature data may be displayed at the same time.

On a display screen 111 at the time of abnormality, the data acquired by the external sensor 3, the message text "abnormality" of the determination result, the threshold of the determination criterion, and the message text of "camera recording start" are displayed in a superimposed manner. A normal view can be obtained which transmits the area other than these texts displayed in a superimposed manner from the eye 40 of the worker 400.

On a recording preparation screen 112 after the transition, the data acquired by the external sensor 3, the message text "abnormality" of the determination result, the threshold of the determination criterion, and the message text "please align the position of the external sensor to the display center" and a guide 112A at the center of the display are displayed in a superimposed manner. A normal view can be obtained which transmits the area other than these texts displayed in a superimposed manner from the eye 40 of the worker 400.

On a recording screen 113 after the recording is started, the data acquired by the external sensor 3, the message text "abnormality" of the determination result, the threshold of the determination criterion, and the message text "recording" are displayed in a superimposed manner. A normal view can be obtained which transmits the area other than these texts displayed in a superimposed manner from the eye 40 of the worker 400.

The camera 11 may stop recording when a predetermined time is exceeded or may determine a recording time from the remote side when an abnormal state occurs and give an instruction. For example, the recording duration time may be associated with each process of the work information storage part 151, and in rewriting from the remote side, the process information of the work information storage part 151 may be rewritten. In addition, a mechanism may be configured to automatically contact a remote administrator when an abnormal state occurs. For the communication, for example, a fixed text may be automatically transmitted to the administrator, or an automatic telephone call (or voice chat or the like) may be made, so as to immediately report the situation to the administrator.

Figure 12:
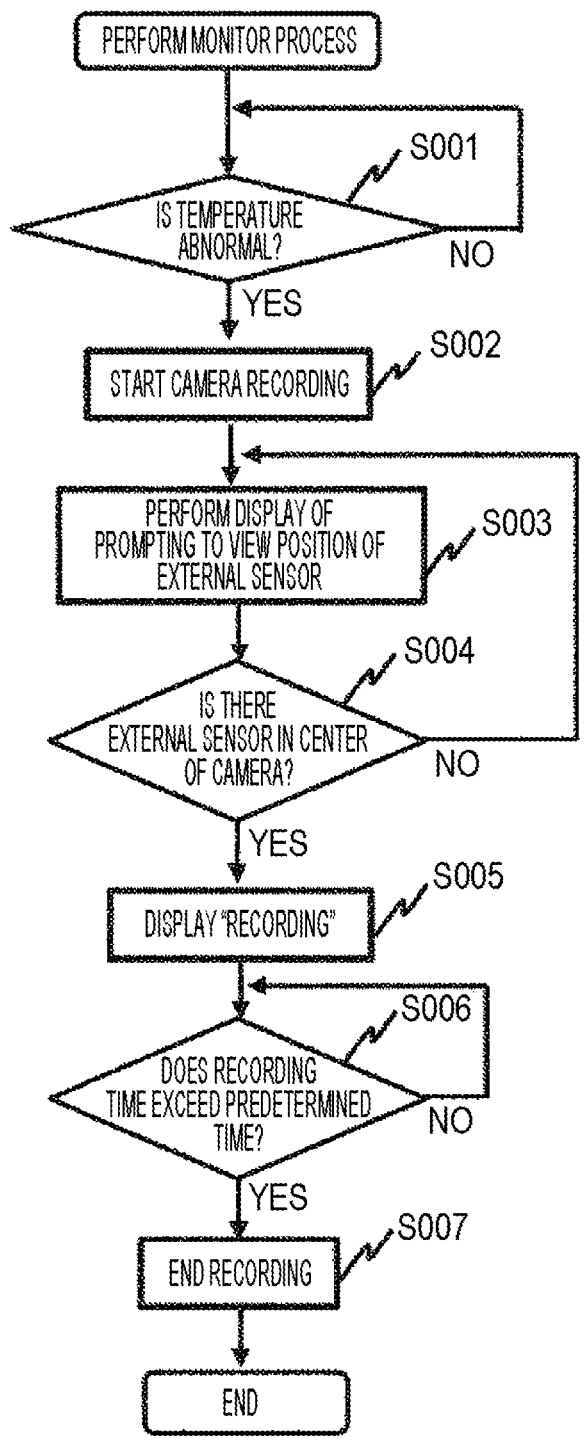
FIG. 12 is a diagram illustrating an example of a flowchart of a monitor process.

FIG. 12 is a diagram illustrating an example of a flowchart of a monitor process. The monitor process is started when the video recording device 1000 is turned on.

First, it is determined whether or not the temperature is abnormal (step S001). Specifically, the determination part 12 determines whether or not the temperature detected by the external sensor 3 is abnormal by acquiring information from the threshold information storage part 13 and comparing the information with the threshold. When the temperature is normal (in the case of "No" in step S001), the determination part 12 continues to perform step S001.

In a case where the temperature is abnormal (in the case of "Yes" in step S001), the image processing part 153 displays a message text "camera recording start" (step S002). Specifically, the image generation part 1531 creates the display screen 111 at the time of abnormality and displays the screen on the display part 16.

The image processing part 153 performs a display of prompting the user to view the position of the external sensor (step S003). Specifically, the image generation part 1531 creates the recording preparation screen 112 and displays the screen on the display part 16.

The image processing part 153 determines whether or not there is an external sensor in the center of the camera (step S004). Specifically, the image generation part 1531 determines whether or not the position of the detection target of the external sensor in the range of the display center is aligned with the display center when image generation part 1531 determines whether or not the specific information (a marking pattern provided with temperature sensor) of the detection target of the external sensor 3 satisfies a prescribed condition. If there is no external sensor at the center of the camera (in the case of "No" in step S004), the image processing part 153 returns the control to step S003.

If there is an external sensor in the center of the camera (in the case of "Yes" in step S004), the image processing part 153 displays a message text "recording" (step S005). Specifically, the image generation part 1531 creates the recording screen 113 and displays the screen on the display part 16.

The camera 11 determines whether or not the recording time exceeds a predetermined time (step S006). If the recording time does not exceed the predetermined time (in the case of "No" in step S006), the camera 11 performs the determination in step S006.

In a case where the recording time exceeds the predetermined time (in the case of "Yes" in step S006), the camera 11 ends the recording (step S007).

The above description is the flow of the monitor process of the video recording device 1000. According to the monitor process, it can be determined whether or not the detection value of the temperature sensor is abnormal, and the video by the camera 11 can be appropriately recorded at the time of abnormality.

Figure 13:
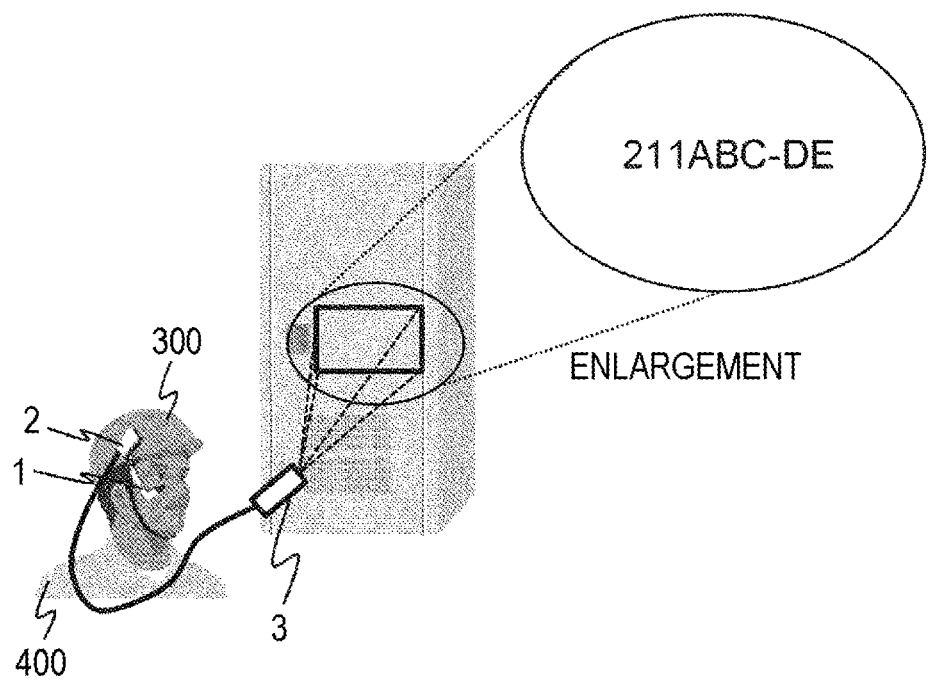
FIG. 13 is a diagram illustrating a usage example when a visible light camera is used as an external sensor.
Figure 14:
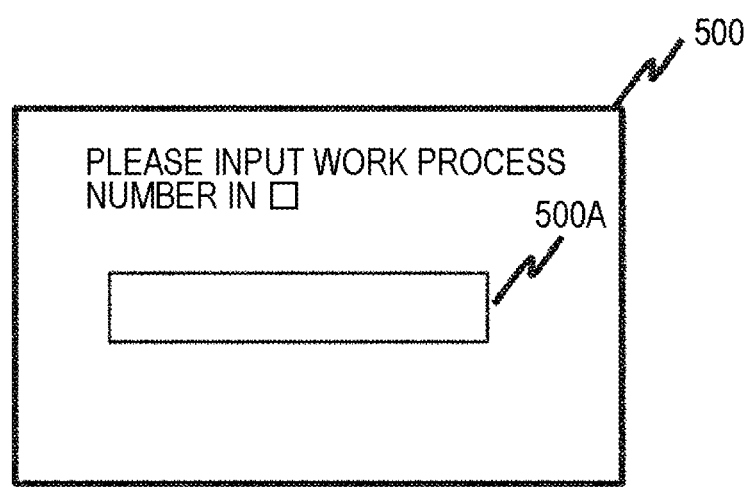
FIG. 14 is a diagram illustrating an example of an auxiliary display on the HMD at the time of character recognition using an external sensor.
Figure 15:
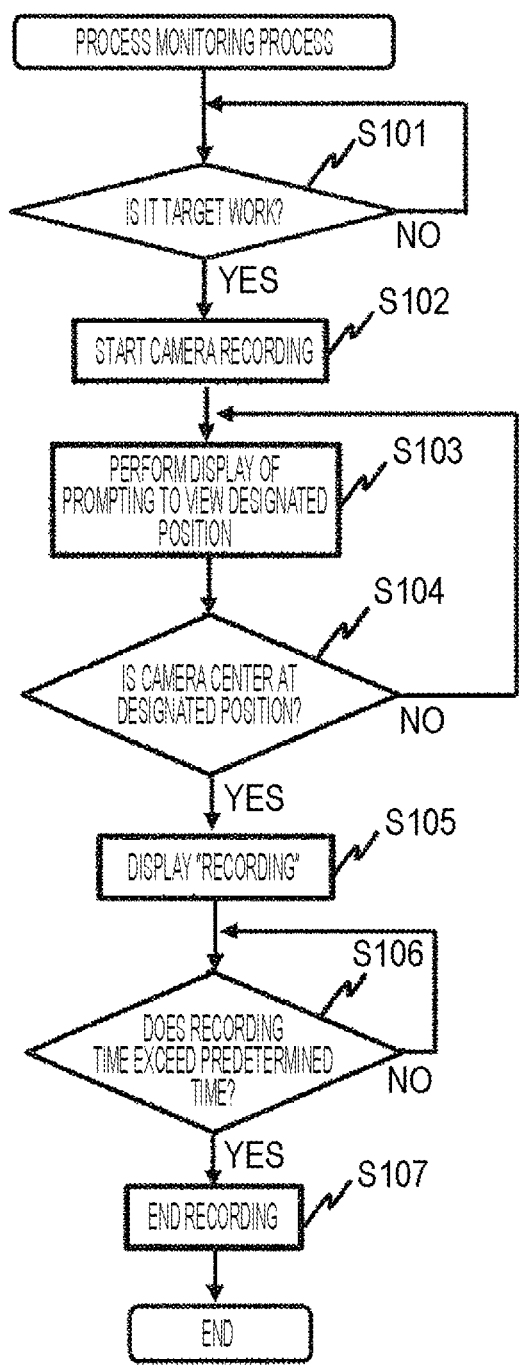
FIG. 15 is a diagram illustrating an example of a flowchart of a process monitoring process.

In the example illustrated in FIGS. 11 and 12, a temperature sensor is used as the external sensor 3. However, the present invention is not limited to the above description, and various sensors other than the temperature sensor can be used. FIGS. 13 to 15 illustrate examples in which a visible light camera is used as the external sensor 3.

FIG. 13 is a diagram illustrating a usage example when a visible light camera is used as an external sensor. The worker 400 points the external sensor 3 toward the target board and takes an image. It is assumed that the number of the work process (for example, "211ABC-DE" in FIG. 13), an augmented reality (AR) marker, the text of the name of the board, and the like are written on the target board. For example, in a case where the number of a work process is read, and the work process is a work process that should be recorded (for example, there are many problems, or an accident has occurred in the past), video recording by the camera 11 is started.

Since a place that is likely to cause a problem in each work process can be determined in advance, the video recording device 1000 performs display for guiding the visual line of the worker 400 so as to focus on such a designated position. For example, when a display of prompting the user to view the first breaker in the board is output to the display part 16, and it is detected that the first breaker is positioned at a designated position (for example, the display center) in the video, it is recognized that the center of the camera 11 is adjusted to the designated position. Usually, since each breaker has a unique number, it is possible to specify the target breaker by recognizing characters.

After the start of recording, the video recording device 1000 outputs "recording" to the display part 16 similarly with the recording screen 113 of FIG. 11. In a case where the recording time exceeds a predetermined time, the capturing may be stopped, or if the imaging time is updated from the remote cloud server 200, the recording time according to the update may be used.

FIG. 14 is a diagram illustrating an auxiliary display example on the HMD at the time of character recognition using an external sensor. It is effective to display a frame 500A clearly indicating the position where the external sensor 3 captures a character on the screen 500 of the display part 16 in that an instruction to the worker 400 is clarified, and the work is prevented from being confused. As an accurate character recognition method, it is effective to compare a data list with characters recognized from the video captured by the external sensor 3. At the work site, the numbers on the board, work numbers, and the like are all stored in the work information as data. By comparing the recognized characters with the data list in the work information and selecting a similar character string, the character recognition can be performed with high accuracy.

FIG. 15 is a diagram illustrating an example of a flowchart of the process monitoring process. The process monitoring process starts in a case where the video recording device 1000 is turned on when a visible light camera is used as an external sensor.

First, it is determined whether or not the work is a target work (step S101). Specifically, the determination part 12 determines whether the breaker detected by the external sensor 3 is a work object by acquiring information from the work information storage part 151 and comparing the information with the work information. In a case where it is not a target work (in the case of "No" in step S101), the determination part 12 continues to perform step S101.

In the case of the target work (in the case of "Yes" in step S101), the image processing part 153 displays a message text "camera recording start" (step S102). Specifically, the image generation part 1531 creates a display screen on which a message text "camera recording start" is superimposed and displays the display screen on the display part 16.

The image processing part 153 performs a display of prompting to view the designated position (step S103). Specifically, the image generation part 1531 creates the screen 500 including the frame 500A and causes the display part 16 to display the screen.

The image processing part 153 determines whether or not the camera center is at the designated position (step S104). Specifically, the image generation part 1531 determines whether or not the center of the visual field of the camera 11 is in the range of the display center. In a case where there is no camera center at the designated position (in the case of "No" in step S104), the image processing part 153 returns the control to step S103.

In a case where the external sensor is at the center of the camera (in the case of "Yes" in step S104), the image processing part 153 displays a message text "recording" (step S105). Specifically, the image generation part 1531 displays the message text "recording" on the display part 16.

The camera 11 determines whether or not the recording time exceeds a predetermined time (step S106). In a case where the recording time does not exceed the predetermined time (in the case of "No" in step S106), the camera 11 performs the determination in step S106.

In a case where the recording time exceeds the predetermined time (in the case of "Yes" in step S106), the camera 11 ends the recording (step S107).

The above description is the flow of the process monitoring process of the video recording device 1000. According to the process monitoring process, it is determined whether or not the work is a process work using the external sensor 3. If the work is a process work, the video by the camera 11 can be appropriately recorded.

Herein, in the process of recognizing a very small character, the video recording device 1000 is not limited to the video captured by the external sensor 3, and may perform character recognition using the video acquired by the camera 11.

In a case where the characters on the breaker in the board are considerably small or in a case where the characters are written in a narrow place, the HMD camera 11 may not be able to resolve and the video sufficient for character recognition may not be obtained.

Therefore, the character recognition may be performed using the video captured by the external sensor 3, and after recognizing whether the work is a target work, recording may be performed simultaneously using both the camera 11 and the external sensor 3. In this case, the camera 11 acquires the visual field of the worker in the gaze direction, so as to facilitate grasping the whole image, and whether an appropriate work is being performed can be checked from the administrator side through the remote cloud server 200. The image of the external sensor 3 is used as a close-up image to recognize a target character and acquire a detailed video recording.

The information for determining whether or not to perform recording at the same time may be stored in the work information storage part 151 in a case where it is known in advance that the target character in the board is small. The external sensor 3 used at this time may be a visible light camera that has a narrow field angle and a short focal length with respect to the camera 11. Since the camera 11 is intended to take a video of a human's visual line, a certain field angle is required. However, the external sensor 3 can be configured as a camera with a narrow field angle and a short focal length and can perform imaging with a high resolution. With such a configuration, even when an image sensor having the same resolution as that of the camera 11 is used, an image with higher resolution than that of the camera 11 can be taken, and characters and drawings can be easily recognized.

Assuming imaging in a dark place, the external sensor 3 may be also provided with a light such as a light emitting diode (LED) so as to illuminate the sensor detection portion. In addition, the remote controller 31 may be provided for switching operation of the work process of the HMD. Alternatively, the external sensor 3, the remote controller 31, and the light may be integrated. For observing narrow places, it is preferable to have a structure in which the external sensor 3 has an elongated pen-shape, a detection part is provided at the tip thereof, the tip is illuminated by an LED, and a hard button is provided on the handle to form the remote controller 31.

In a case where the images of the camera 11 and the external sensor 3 are shared with the cloud server 200 used by the remote administrator, the videos of both the camera 11 and the external sensor 3 may be projected on the monitor viewed by the remote administrator. In addition, among two videos, the video that is not the video that the user wants to view may be transmitted to the cloud server 200 with a reduced resolution by the video recording device 1000. By reducing the video resolution, the amount of communication between the wireless communication part 17 and the external wireless communication part 100 can be reduced, so that an effect of suppressing image delay and power consumption can be obtained.

The above description is an example in which a visible light camera is used as the external sensor 3. However, the camera is not limited to the visible light camera and may be an infrared (IR) camera or other cameras. In addition, a time-of-flight (TOF) camera may be used to acquire 3D data by acquiring distance images to detect the deformation of objects, the abnormal operation of devices with dynamic mechanisms (for example, robots), and the like, and the recording of the camera 11 may be performed. Alternatively, an illuminance sensor may be used to perform the recording when the brightness is insufficient. For example, it is possible to detect a decrease in the lamp illuminance of the device, record the target lamp, and lead to a work for performing appropriate replacement.

Figure 16:
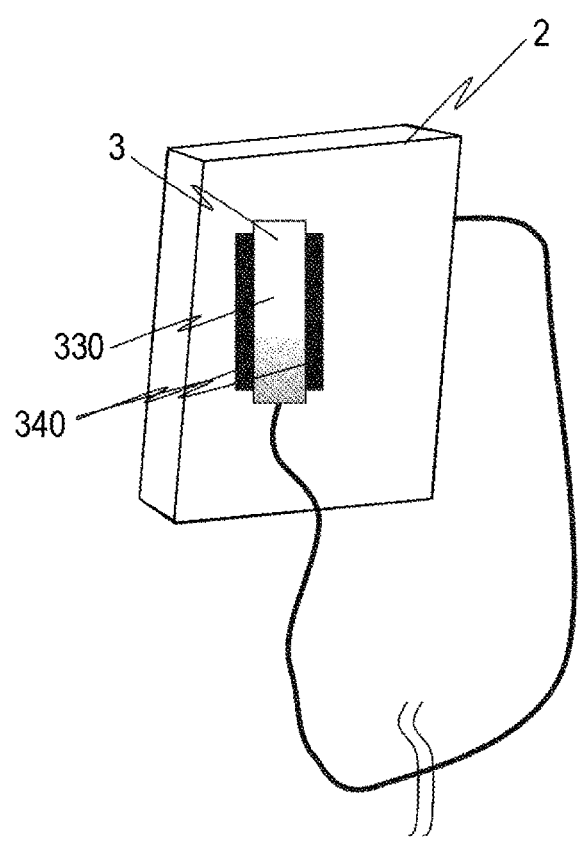
FIG. 16 is a diagram illustrating an example of a storage structure of the an external sensor.

FIG. 16 is a diagram illustrating an example of a storage structure of the external sensor. Herein, the description is given about an example of the storage structure in a case where the wired external sensor 3 is stored in the controller 2. However, the external sensor 3 is not limited to the wired external sensor 3 and a wirelessly connected external sensor 3 can be stored in the same manner.

The external sensor 3 is fixed by an external sensor fixing member 340 on the controller 2, and it is possible to detect whether or not the external sensor 3 is in contact with a contact detection sensor 330 on the controller 2.

Figure 17:
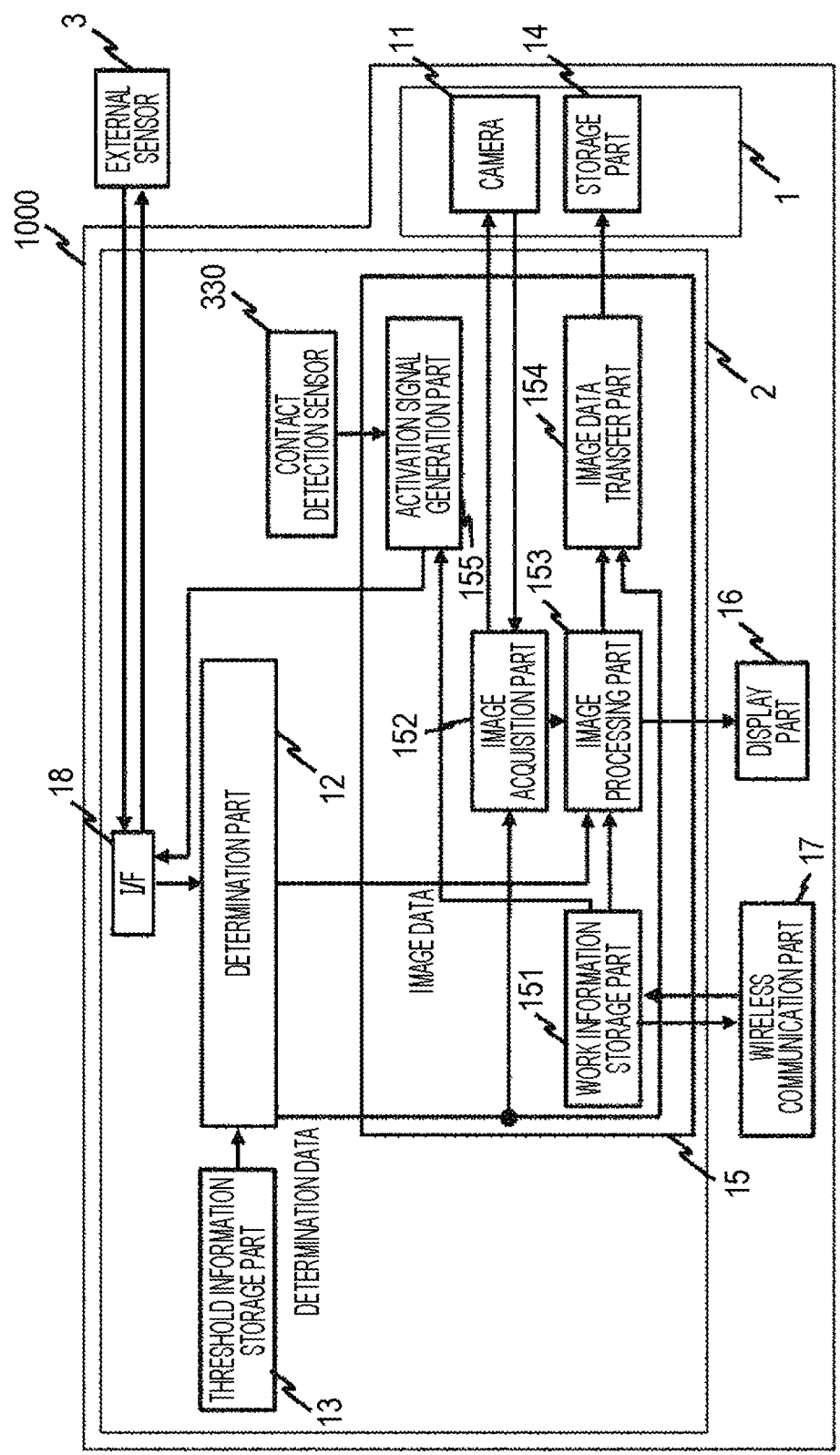
FIG. 17 is a block diagram illustrating a connection example of a contact detection sensor.

FIG. 17 is a block diagram illustrating a connection example of the contact detection sensor. This example is basically the same as the configuration example of the video recording device illustrated in FIG. 5, but there are some differences. The following description focuses on the differences.

The connection example of FIG. 17 is different in that the control part 15 includes an activation signal generation part 155, the work information storage part 151 and the activation signal generation part 155 are connected, and the contact detection sensor 330 is included in the controller 2.

A signal indicating the result detected by the contact detection sensor 330 is input to the activation signal generation part 155 in the control part 15. If the signal indicates a contact state, the activation signal generation part 155 maintains the signal level at 0 (GND level). That is, this case indicates that the external sensor 3 is fixed to the external sensor fixing member 340, and the video recording device 1000 is in the sleep state (standby state).

If the signal indicates a non-contact state, the activation signal generation part 155 outputs a signal level 1 (power supply level) and outputs an activation signal to the external sensor 3 through the I/F 18 to activate the external sensor. The signal level may be changed by the signal level according to the specifications of the external sensor 3 or may be changed by exchanging commands. In addition, the activation is performed when the signal level is 1 (power supply level), but the activation may be performed when the signal level is 0 (GND) level with reverse polarity. That is, any configuration may be used as long as the activation signal generation part 155 detects the switching of the state and outputs an appropriate signal to the external sensor 3.

As the contact detection sensor 330, an illuminance sensor, a proximity sensor, or the like can be used. However, the present invention is not limited thereto, and any device may be used as long as the device can detect the connection with the external sensor fixing member 340. Of course, a configuration may be employed in which the contact detection sensor 330 is provided on the external sensor 3 side.

The external sensor 3 may be enabled according to the work procedure. The activation signal generation part 155 receives the information in the work information storage part 151. The activation signal generation part is invalidated in a work process that does not require the external sensor 3 and is not activated when the worker accidentally removes the external sensor 3 from the external sensor fixing member 340. By adopting such a configuration, it is possible to prevent erroneous detection and suppress power consumption.

The imaged and recorded video information may be used to detect and record whether or not the worker is performing an appropriate work.

Figure 18:
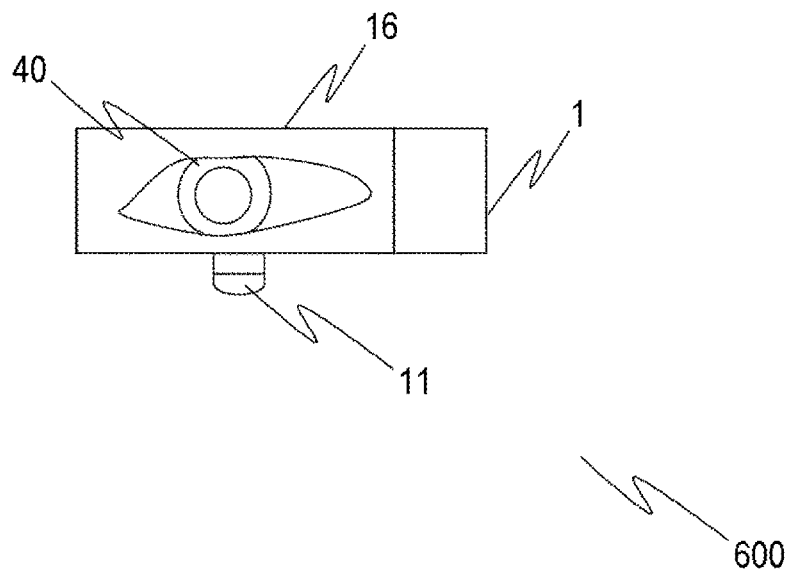
FIG. 18 is a diagram illustrating a configuration example of a camera that detects a gaze direction of a wearer.

FIG. 18 is a diagram illustrating a configuration example of a camera that detects the gaze direction of the wearer. FIG. 18 illustrates a state where the vicinity (near the left eye) 600 of the eye 40 of the worker 400 wearing the head mount part 1 is viewed from a front surface.

Figure 19:
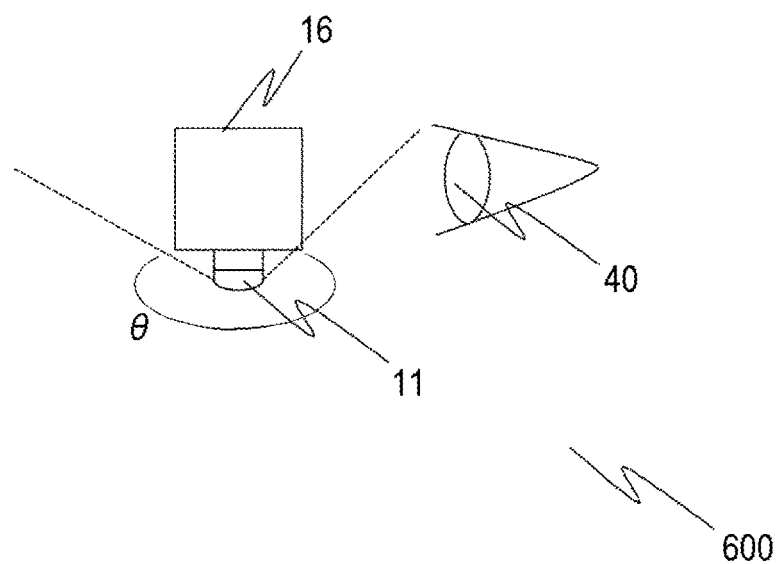
FIG. 19 is a diagram illustrating the configuration example of the camera that detects the gaze direction of the wearer.

FIG. 19 is a diagram illustrating a configuration example of the camera that detects the gaze direction of the wearer. FIG. 19 illustrates a state where the vicinity (near the left eye) 600 of the eye 40 of the worker 400 wearing the head mount part 1 is viewed from a side surface (left surface).

The camera 11 has a lens having an imaging visual field at a wide angle (for example, field angle θ: 240 degrees), and is installed so as to protrude downward from the display part 16 of the head mount part 1. Further, the imaging visual field of the camera 11 includes the eye 40 itself of the wearer in addition to the direction of the visual line of the wearer. With such a configuration, it is possible to accurately detect the gaze direction and accurately detect whether the worker 400 is appropriately performing the work.

Incidentally, the present invention is not limited thereto, and the work movement may be detected by using another sensor together. For example, since the movement of the head can be detected by the acceleration sensor, it is possible to present an appropriate alert assuming the gaze direction of the worker 400.

Figure 20:
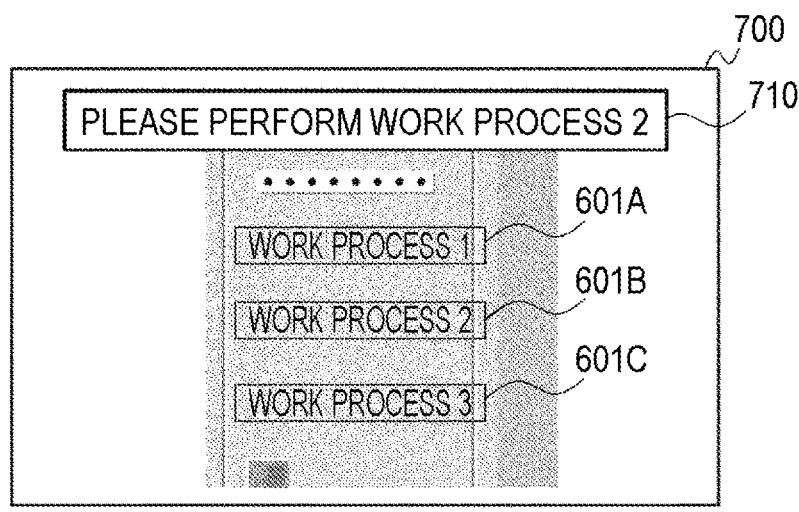
FIG. 20 is a diagram illustrating a display example of an alert of a board work.

FIG. 20 is a diagram illustrating a display example of an alert of a board work. In the display example 700 of the display part 16, a work process 1 (601A), a work process 2 (601B), and a work process 3 (601C) are illustrated in order, which indicates that the work is performed in that order.

In this state, when the work process being watched by the worker 400 is different from the work order, the display part 16 displays a warning display 710 in a superimposed manner. For example, in a case where the work process 1 is finished, but the work process 2 is not finished, and the time when the worker 400 is watching the display of work process 3 (601C) is long, there is high possibility that the work process 3 is performed. In that case, when a warning display 710 such as "please perform work process 2" is performed, work errors are reduced effectively.

In order for the worker 400 to detect a gaze at a predetermined position on the display part 16, for example, when the work object in the gaze direction of the imaging visual field differs from the object in the order to be subject to work at the time of imaging with the camera 11, and the observation time (staying time) exceeds (stays) a predetermined value, it is detected that a wrong work target is gazed. Furthermore, in order to accurately specify the gaze direction, it is effective to image the eye 40 of the worker 400 with the camera 11 that detects the above-described gaze direction, specify the direction of the black eye by coordinate conversion, and regard the direction as the gaze direction.

Figure 21:
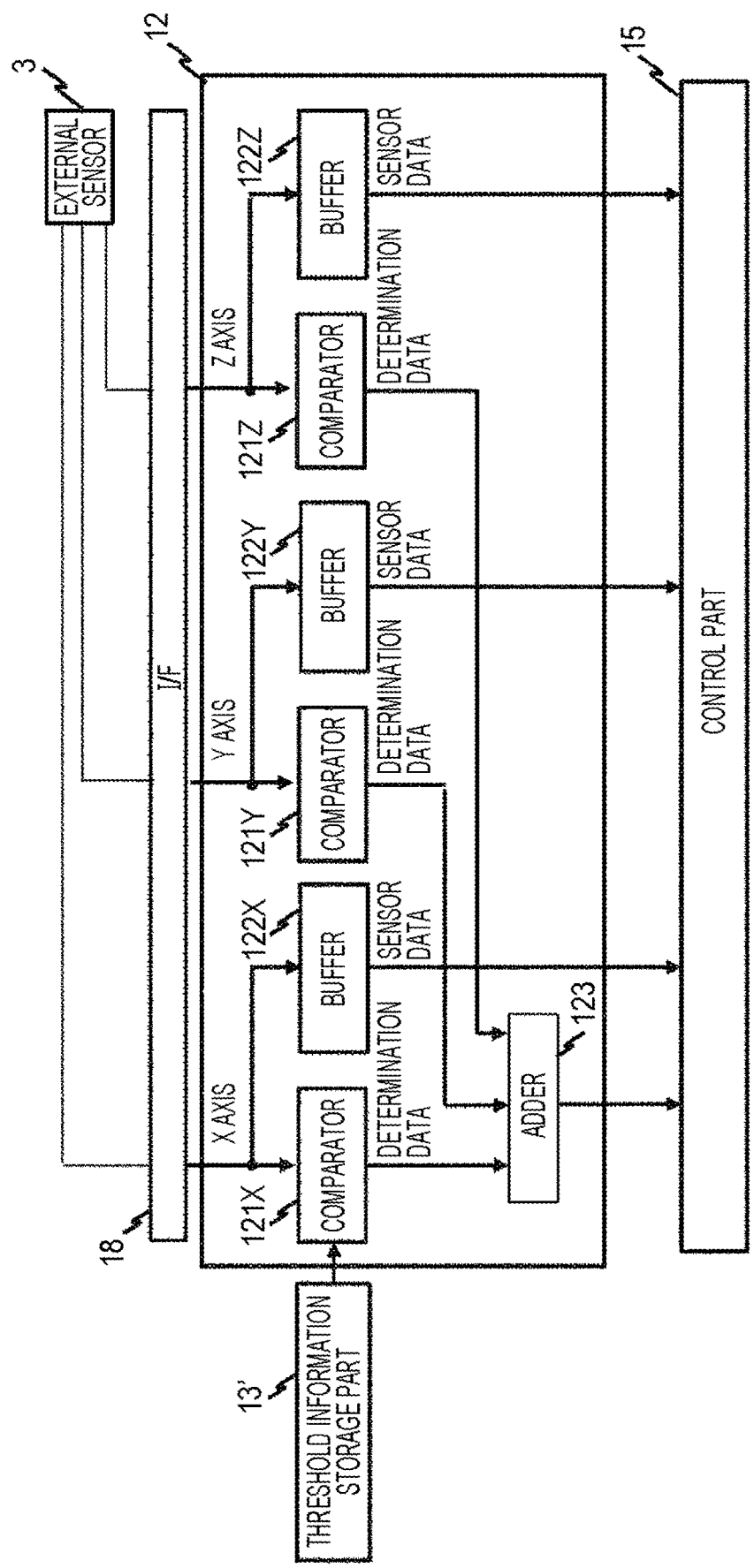
FIG. 21 is a block diagram illustrating an example of the internal structure of the determination part using an acceleration sensor.

FIG. 21 is a block diagram illustrating an example of an internal structure of the determination part using an acceleration sensor. When a three-axis acceleration sensor is used as the external sensor 3, the I/F 18 acquires three-axis acceleration values of the X axis, the Y axis, and the Z axis. In this case, the threshold information storage part 13' must hold these three-axis acceleration values, and these three-axis acceleration values can be freely used in determining an abnormality.

In the example of FIG. 21, a configuration example is illustrated in which it is detected as an abnormality that there is a fluctuation exceeding a predetermined range with respect to the amount of change in acceleration in any axis direction of the three axes. The determination part 12 includes an X-axis comparator 121X, an X-axis buffer 122X, a Y-axis comparator 121Y, a Y-axis buffer 122Y, a Z-axis comparator 121Z, and a Z-axis axis buffer 122Z, and an adder 123 for adding determination data from these comparators.

The X-axis comparator 121X, the Y-axis comparator 121Y, and the Z-axis comparator 121Z acquire the accelerations of respective axes from the I/F 18, read the thresholds of respective axes and perform comparison with reference to the threshold information storage part 13', and output determination data (0: normal, 1: abnormal) to the adder 123.

The X-axis buffer 122X, the Y-axis buffer 122Y, and the Z-axis buffer 122Z acquire and buffer the accelerations of respective axes from the I/F 18. In addition, the X-axis buffer 122X, the Y-axis buffer 122Y, and the Z-axis buffer 122Z output the sensor data to the control part 15.

The adder 123 acquires and adds the determination data (0: normal, 1: abnormal) about the abnormality/normality of respective axes from the X-axis comparator 121X, the Y-axis comparator 121Y, and the Z-axis comparator 121Z. If the result is 1 or more, "1 (abnormality detection signal)" is output to the control part 15, and otherwise, "0 (GND)" is output.

FIG. 22 is a diagram illustrating an example of the data structure of the threshold information storage part in the case of the acceleration sensor. For each process 13A', the threshold information storage part 13' stores a combination threshold 13B' of an X threshold that is a threshold of the X axis, a Y threshold that is a threshold of the Y axis, and a Z threshold that is a threshold of the Z axis in association. In each of the X threshold, the Y threshold, and the Z threshold, the range of the normal value of the amplitude and period of the graph indicating the time series change of the acceleration is stored.

In this way, a determination part using an acceleration sensor can be realized. For example, it can be determined whether there is no abnormal action or no useless operation in the operation of the worker, and the video of the camera 11 can be automatically recorded when there is an abnormality.

Figure 23:
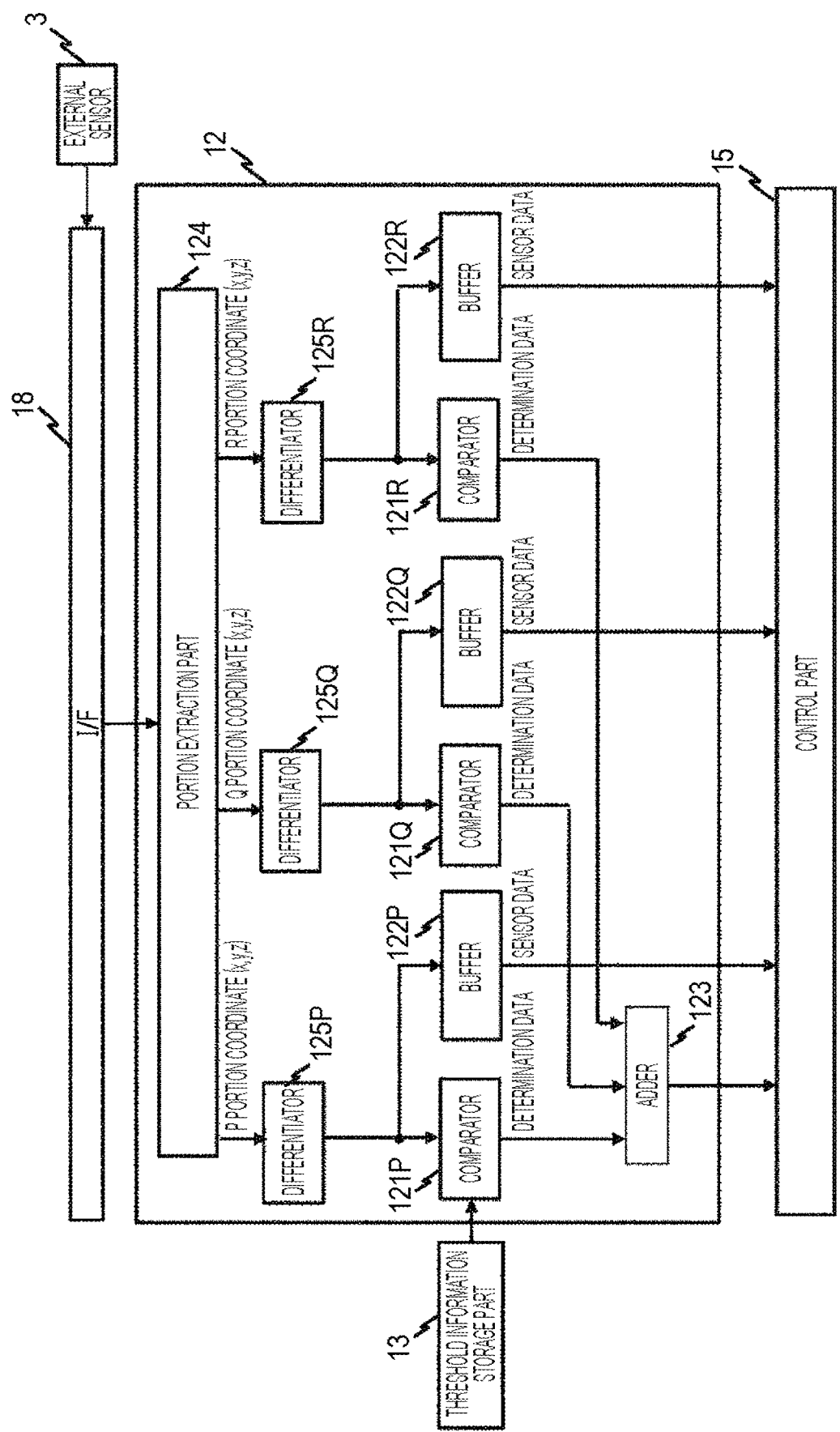
FIG. 23 is a block diagram illustrating an example of the internal structure of the determination part using a TOF camera.

FIG. 23 is a block diagram illustrating an example of the internal structure of the determination part using a TOF camera. In a case where the TOF camera is used as the external sensor 3, the I/F 18 acquires an image with distance data acquired by the TOF camera.

The determination part 12 includes a P portion coordinate comparator 121P, a P portion coordinate buffer 122P, a Q portion coordinate comparator 121Q, a Q portion coordinate buffer 122Q, and an R portion coordinate comparator 121R, a R portion coordinate buffer 122R, the adder 123 for adding determination data from these comparators, a portion extraction part 124, a P portion coordinate differentiator 125P, a Q portion coordinate differentiator 125Q, and a R portion coordinate differentiator 125R.

The portion extraction part 124 acquires an image with distance data acquired by the TOF camera from the I/F 18 and extracts coordinates of a predetermined part of the human body by using a known algorithm. For example, the portion extraction part 124 specifies portions such as a head, a shoulder, an arm, a hand, and a leg by skeleton detection, and specifies three-dimensional coordinates (x, y, z) for each portion by matching with distance data. For example, the portion extraction part 124 specifies a P portion as an arm, a Q portion as a hand, and an R portion as a foot, and acquires one or more representative three-dimensional coordinates.

The P portion coordinate differentiator 125P, the Q portion coordinate differentiator 125Q, and the R portion coordinate differentiator 125R perform differentiation using three-dimensional coordinates for respective portions and calculate the speeds of the respective portions.

In this case, the threshold information storage part 13 must hold respective speed values of these parts, and the speed values for these parts can be freely used in determining an abnormality.

Figure 24:
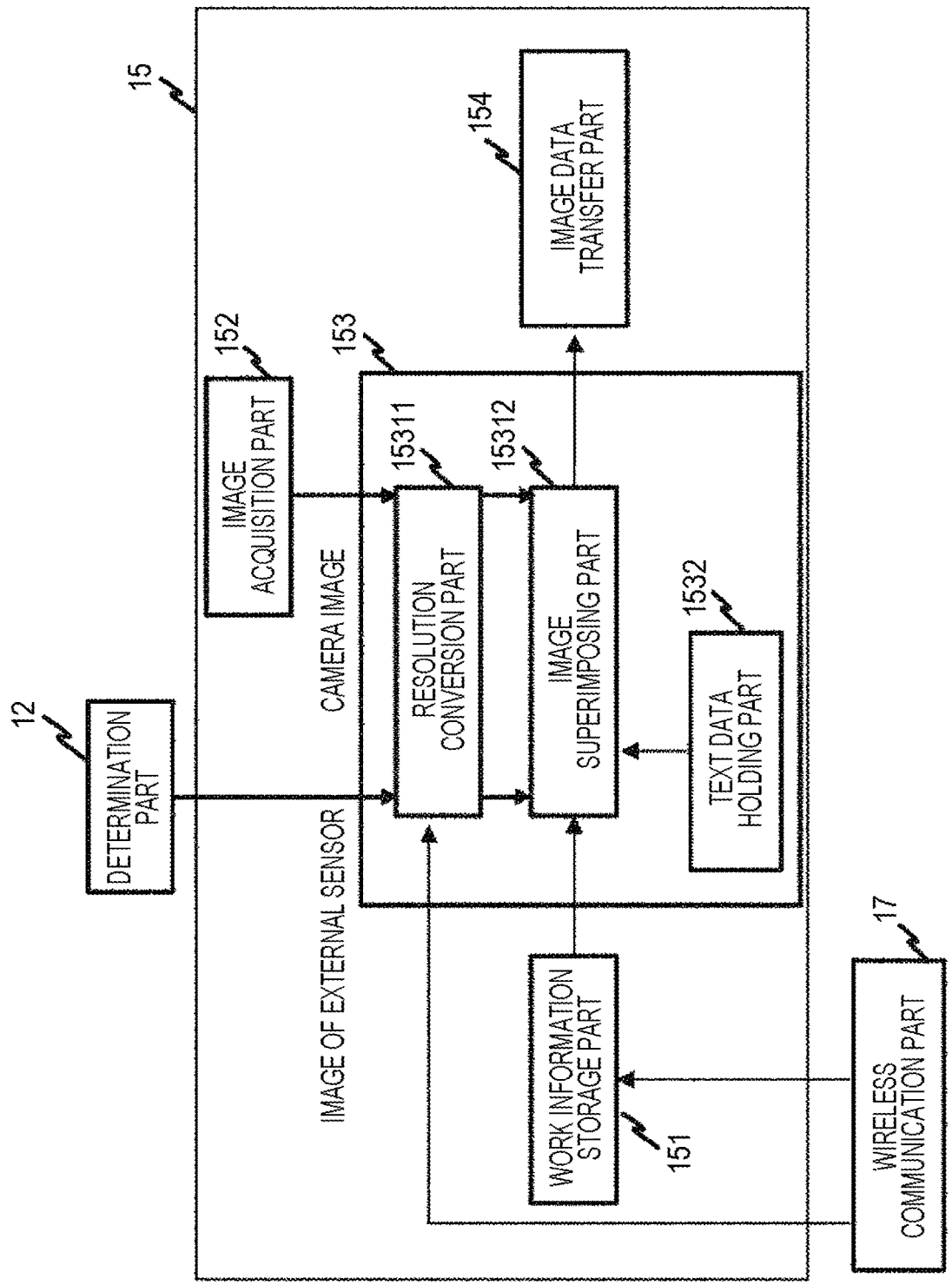
FIG. 24 is a block diagram illustrating an example of the internal structure of the control part that lowers a resolution.

FIG. 24 is a block diagram illustrating an example of the internal structure of the control part that lowers a resolution. In a case where the external sensor 3 is a visible light camera or a camera, which acquires video information, such as a TOF camera or a thermal camera, both the video captured by the camera 11 and the image captured by the external sensor 3 can be obtained to be remotely referred to through the cloud server 200 as described above. In addition, it is possible to reduce the amount of communication by giving an instruction to lower the resolution of one or both images through a remote cloud server. Furthermore, work information and threshold information can be transmitted and updated remotely.

Such a mechanism can be realized by the internal structure illustrated in FIG. 24. The image processing part 153 of the control part 15 includes a resolution conversion part 15311, an image superimposing part 15312, and a text data holding part 1532.

The resolution conversion part 15311 receives a target image (either the image of the external sensor 3 or the video of the camera 11) and the resolution data thereof through the wireless communication part 17. In addition, the resolution conversion part 15311 receives the image of the external sensor 3 from the determination part 12 and the video of the camera 11 from the image acquisition part 152, converts the image and the video to a predetermined resolution each frame, and delivers the image and the video to the image superimposing part 15312. After receiving the target image and the resolution data thereof through the wireless communication part 17, the resolution conversion part 15311 converts the target image into the received resolution and delivers the target image to the image superimposing part 15312.

In a case where the target image and the resolution data thereof are not received through the wireless communication part 17, the resolution conversion part 15311 maintains the same resolution as that of the previous frame.

The image superimposing part 15312 superimposes necessary information extracted from the information of the work information storage part 151 and the information of the text data holding part 1532 on the image and video received from the resolution conversion part 15311 and delivers the data to the image data transfer part 154.

For example, when an instruction (including the camera and parameters of 640 and 480) to form the video of the camera 11 to 640 dots×480 dots is received from the cloud server 200, the resolution conversion part 15311 converts the video of the camera 11 from the next frame to 640 dots×480 dots and delivers the video to the image superimposing part 15312. In this way, it is possible to reduce the communication amount by lowering the resolution.

In the video recording device 1000 described above, the determination part 12 and the control part 15 in the controller 2 can be realized by a central processing unit (CPU). In addition, the threshold information storage part 13 can be realized by a main storage device such as a random access memory (RAM). The storage part 14 can be realized by a flash memory or a solid state drive (SSD).

Incidentally, the present invention is not limited thereto, and the video recording device 1000 may be realized by, for example, an application specific integrated circuit (ASIC) or a microcomputer.

In this way, the video recording device 1000 can efficiently record the work situation and the like with hardware resources such as a limited storage area without hindering the work.

Further, control lines and information lines are described in consideration of necessity for the description, and all control lines and information lines in the product are not necessarily described. It may be considered that almost all the components are connected to each other in actual.

The above-described configurations, functions, processing parts, and the like may be realized in a distributed system by executing a part or all of them by another device and performing integrated processing through a network, for example.

The technical elements of the above-described embodiments may be applied independently or may be applied to be divided into a plurality of parts such as program parts and hardware parts.

Hereinbefore, the present invention was described centering on the embodiments.

What is claimed is:

1. A video recording device comprising:
   a camera which captures a video of a visual-field direction of a wearer;
   a connection part which is communicably connected to an external sensor which detects predetermined external environment information;
   a threshold information storage part which stores a threshold indicating an abnormal state of the external environment information;
   a determination part which outputs an abnormality determination signal by comparing detection information of the external sensor and the threshold;
   a control part which outputs a predetermined control signal to the camera in response to the abnormality determination signal;
   a display part which displays output information from the camera and the external sensor,
   wherein when the abnormality determination signal is output, the control part outputs a control signal for transferring output information from the camera to a predetermined storage part;
   wherein the control part includes
   a work information storage part which stores information of a work performed by the wearer wearing the video recording device,
   an image acquisition part which acquires an output of the camera as an image,
   an image processing part which generates an image obtained by combining the work information and the image, and
   an image transfer part which transfers the combined image to the storage part, and
   when the abnormality determination signal is output from the determination part, the image transfer part transfers the output information to the storage part.

2. The video recording device according to claim 1, wherein
   the external sensor is at least one of a visible light camera, an infrared camera, a distance measurement camera, a temperature sensor, a humidity sensor, an illuminance sensor, and an acceleration sensor.

3. The video recording device according to claim 1, further comprising
   a work information storage part which stores information of a work performed by the wearer wearing the video recording device, wherein
   the external sensor recognizes a character or marker corresponding to a work target, and
   the control part transfers the output information of the camera to the storage part in a case where a work being performed is a target operation for recording video.

4. The video recording device according to claim 1, wherein
   the external sensor is a second camera with a narrower field angle and a shorter focal length than the camera.

5. The video recording device according to claim 1, wherein
   the external sensor is connected to the video recording device through a wired or wireless communication path.

6. The video recording device according to claim 1, wherein
   the external sensor has a structure integrated with a remote control device capable of switching work processes displayed on the display part.

7. A video recording device comprising:
   a camera which captures a video of a visual-field direction of a wearer;
   a connection part which is communicably connected to an external sensor which detects predetermined environment information;
   a threshold information storage part which stores a threshold indicating an abnormal state of the environment information;
   a determination part which outputs an abnormality determination signal by comparing detection information of the external sensor and the threshold;
   a control part which outputs a predetermined control signal to the camera in response to the abnormality determination signal;
   a display part which displays output information from the camera and the external sensor,
   wherein when the abnormality determination signal is output, the control part outputs a control signal for transferring output information from the camera to a predetermined storage part; and
   a contact detection sensor which detects contact with the external sensor, wherein
   the control part outputs a signal for operating the external sensor when a non-contact state is detected by the contact detection sensor.

8. The video recording device according to claim 1, wherein
   the camera has a field angle for detecting both a video of a gaze direction in front of the wearer wearing the video recording device and an eye of the wearer.

9. The video recording device according to claim 1, wherein
   the camera has a field angle for detecting both a video of a gaze direction in front of the wearer wearing the video recording device and an eye of the wearer,
   the control part specifies a direction of a visual line of the wearer wearing the video recording device and a staying time of the visual line, and
   in a case where the direction of the visual line and the staying time of the visual line are different from those of a work being performed, the display part displays a display of facilitating an execution of the work process being performed in a superimposed manner.

10. The video recording device according to claim 1, wherein
when the abnormality determination signal is output, the control part displays on the display part that the camera is recording and displays a guidance of a position to be viewed by the wearer wearing the video recording device.

11. The video recording device according to claim 1, further comprising
a communication part which communicates with other devices through a network, wherein
the threshold information storage part is capable of rewriting the threshold in response to an instruction from the other device.

12. The video recording device according to claim 1, further comprising
a support part which is supported at multiple points on a work helmet.

13. The video recording device according to claim 1, further comprising
a communication part which communicates with other devices through a network, wherein
the control part includes
a work information storage part which stores information of a work performed by the wearer wearing the video recording device,
an image acquisition part which acquires an output of the camera as an image,
an image processing part which generates an image obtained by combining the work information and the image, and
an image transfer part which transfers the combined image to the storage part,
when the abnormality determination signal is output from the determination part, the image transfer part transfers the output information to the storage part, and the work information storage part is capable of rewriting the work information in response to an instruction from the other device.

14. A head mounted display comprising:
a camera which captures a video of a visual-field direction of a wearer;
a connection part which is communicably connected to an external sensor which detects predetermined external environment information;
a threshold information storage part which stores a threshold indicating an abnormal state of the external environment information;
a determination part which outputs an abnormality determination signal by comparing detection information of the external sensor and the threshold;
a control part which outputs a predetermined control signal to the camera in response to the abnormality determination signal; and
a display part which displays output information from the camera and the external sensor, wherein when the abnormality determination signal is output, the control part outputs a control signal for transferring output information from the camera to a predetermined storage part;
wherein the control part includes
a work information storage part which stores information of a work performed by the wearer wearing the video recording device,
an image acquisition part which acquires an output of the camera as an image,
an image processing part which generates an image obtained by combining the work information and the image, and
an image transfer part which transfers the combined image to the storage part, and
when the abnormality determination signal is output from the determination part, the image transfer part transfers the output information to the storage part.

* * * * *